US011538314B2

(12) United States Patent
Chen

(10) Patent No.: US 11,538,314 B2
(45) Date of Patent: Dec. 27, 2022

(54) DOORBELL DEVICE

(71) Applicant: Chicony Electronics Co., Ltd., New Taipei (TW)

(72) Inventor: Chien-Yueh Chen, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 134 days.

(21) Appl. No.: 17/206,922

(22) Filed: Mar. 19, 2021

(65) Prior Publication Data
US 2022/0131224 A1 Apr. 28, 2022

(30) Foreign Application Priority Data
Oct. 26, 2020 (TW) .................................. 109137153

(51) Int. Cl.
G08B 3/10 (2006.01)
(52) U.S. Cl.
CPC ............. G08B 3/10 (2013.01); G08B 3/1058 (2013.01)
(58) Field of Classification Search
CPC .......... G08B 3/10; G08B 3/1058; Y02E 60/10
See application file for complete search history.

(56) References Cited

U.S. PATENT DOCUMENTS

2018/0175522 A1* 6/2018 Ogasawara ......... H01M 10/486
2022/0099606 A1* 3/2022 Wang ................ H01M 10/6554

* cited by examiner

Primary Examiner — Joseph H Feild
Assistant Examiner — Sharmin Akhter
(74) Attorney, Agent, or Firm — Muncy, Geissler, Olds & Lowe, P.C.

(57) ABSTRACT

A doorbell device includes a housing, a passive element, a battery module, and a thermal expansion element. The housing includes a mounting plate, and the mounting plate includes a through hole, an inner surface, and an outer surface. The passive element is movably disposed in the housing. The passive element includes a first side surface and a second side surface. The first side surface faces the mounting plate. The battery module is disposed on the first side surface and corresponds to the through hole. The thermal expansion element is disposed between the second side surface and the housing. The passive element allows a gap to be maintained between the battery module and the outer surface, or is driven, by the thermal expansion element, to allow at least a part of the battery module to be located in the through hole and at the same plane with the outer surface.

13 Claims, 7 Drawing Sheets

DOORBELL DEVICE

CROSS-REFERENCE TO RELATED APPLICATION

This non-provisional application claims priority under 35 U.S.C. § 119(a) to Patent Application No. 109137153 filed in Taiwan, R.O.C. on Oct. 26, 2020, the entire contents of which are hereby incorporated by reference.

BACKGROUND

Technical Field

The instant disclosure relates to a switch device, in particular, to a doorbell device.

Related Art

Doorbells are common devices widely applied in residences and offices. The doorbell is provided for a visitor to notify the person in the building to answer the door. In general, the types of doorbells include wired doorbells, wireless doorbells, and smart doorbells. The wired doorbells are supplied with alternating current through wires; on the other hand, since the wireless doorbells and the smart doorbells are mostly controlled though communication modules, the wireless doorbells and the smart doorbells usually have individual batteries for supplying electricity.

SUMMARY

Concerning a doorbell with a battery inside, because the battery has a predetermined chargeable/dischargeable temperature interval (e.g., between 0° C. and 60° C.), when the ambient temperature is too high or too low, it may be difficult to maintain the temperature of the battery within the foregoing temperature interval. Moreover, after the battery is heated or performs several times of charging/discharging, the battery may expand to push surrounding components, thereby causing the damage of the battery.

In view of this, in one embodiment, a doorbell device is provided. The doorbell device comprises a housing, a passive element, a battery module, and a thermal expansion element. The housing comprises a mounting plate. The mounting plate comprises a through hole, an inner surface, and an outer surface. The through hole is defined through the inner surface and the outer surface of the mounting plate. The passive element is movably disposed in the housing. The passive element comprises a first side surface and a second side surface opposite to each other. The first side surface faces the mounting plate. The battery module is disposed on the first side surface and corresponds to the through hole. The thermal expansion element is disposed between the second side surface of the passive element and the housing. When a temperature of the thermal expansion element is at a first temperature, the passive element allows a gap to be maintained between the battery module and the outer surface of the housing. When the temperature of the thermal expansion element is at a second temperature, the thermal expansion element drives the passive element to allow at least one portion of the battery module to be located in the through hole and to allow the at least one portion of the battery module and the outer surface to be at a same plane.

Based on the above, in the doorbell device according to one or some embodiments of the instant disclosure, with the thermal expansion and contraction feature of the thermal expansion element, the position of the passive element can be changed. Hence, when the battery module is at a low temperature, a gap is maintained between the battery module and the outer surface of the housing so as to prevent the heat loss of the battery module; when the battery is at a high temperature, the battery module can contact an object (e.g., the wall) where the outer surface of the housing is assembled so as to achieve heat dissipation. Moreover, according to one or some embodiments of the instant disclosure, after the battery module is heated or performs charging/discharging for several times so as to be expanded, the battery module does not push other components of the doorbell device to cause damages of the doorbell device.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
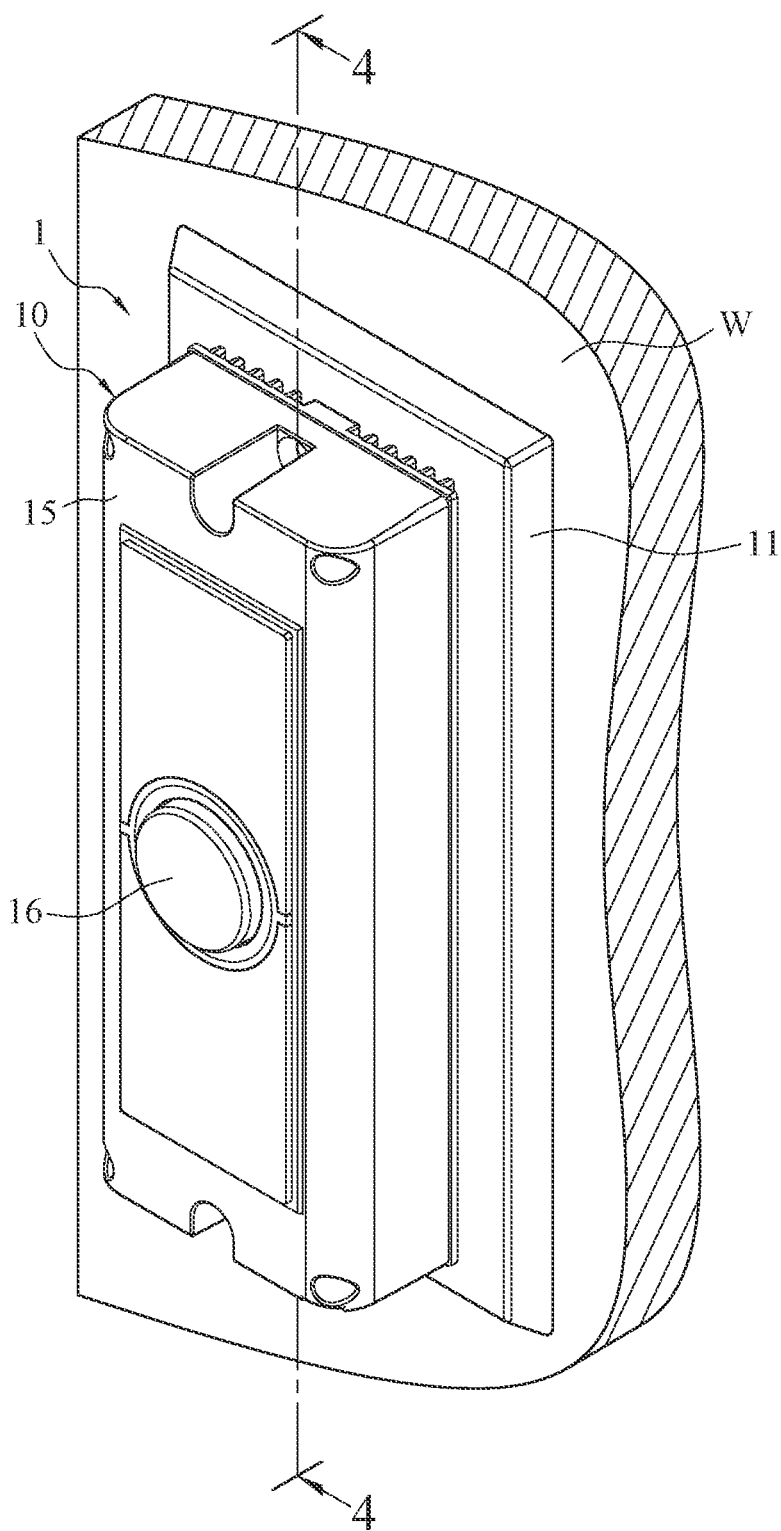
FIG. 1 illustrates a perspective view of a doorbell device according to a first embodiment of the instant disclosure.

It should be noted that, in the descriptions for the embodiments, the ordinal numbers "first", "second", etc. are used to describe different elements, and these elements are not limited due to the use of these ordinal numbers. In the descriptions for the embodiments, the terms "couple" or "connect" are used to indicate that two or more elements are connected to each other physically or electrically in a direct manner, or are used to indicate that two or more elements are connected to each other physically or electrically in an indirect manner. Furthermore, the terms "couple" or "connect" may be used to indicate two or more elements cooperate or interact with each other. Moreover, for sake of convenience and clarity, the thicknesses or the dimensions of the elements in the drawings are presented exaggeratedly, omittedly, or generally, and the person having ordinary skills in the art still can realize and read. The sizes shown in all the drawings in reference with the specification, are not intended to limit the present disclosure, but merely facilitate the understanding and reading for those skilled in the art. Modifications and variations in different scale or sizes can be made without departing from the spirit of the present disclosure. In all the drawings, same reference numbers or labels are used to indicate same or similar elements.

Figure 2:
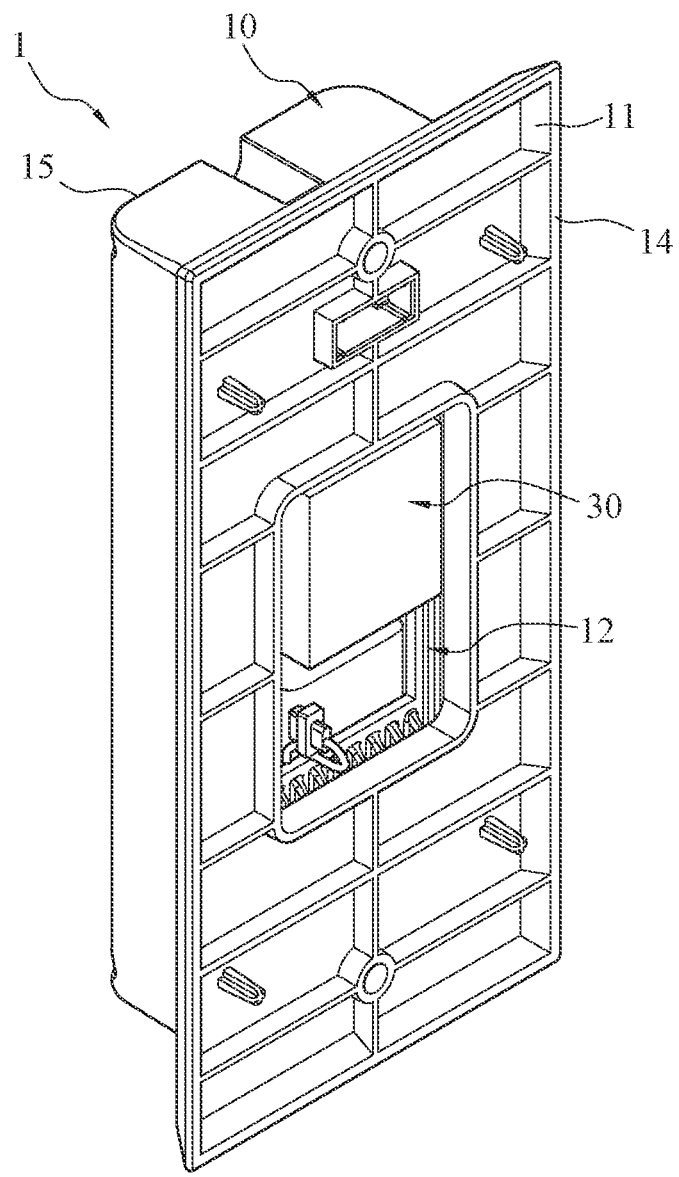
FIG. 2 illustrates another perspective view of the doorbell device of the first embodiment.
Figure 3:
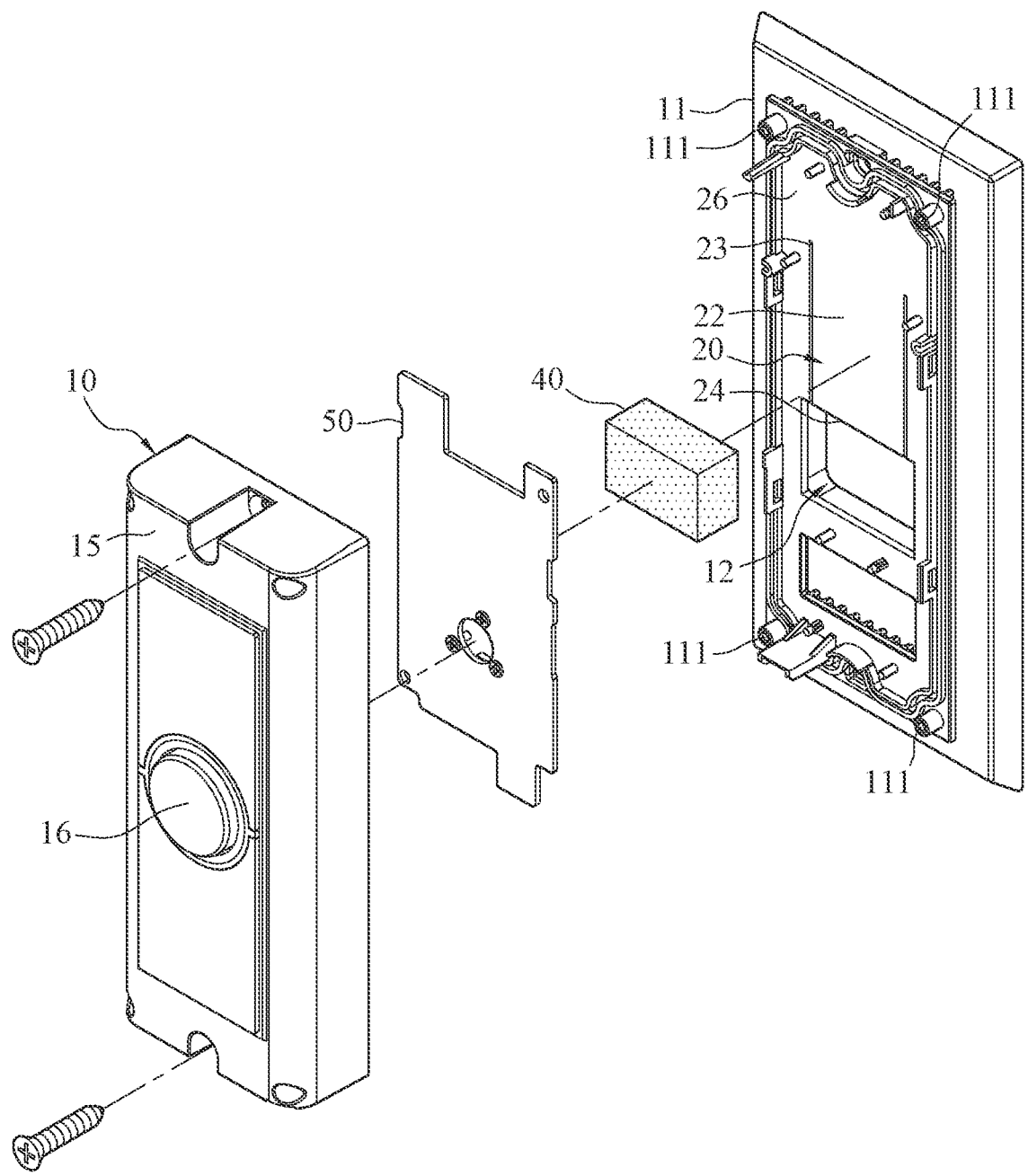
FIG. 3 illustrates an exploded view of the doorbell device of the first embodiment.
Figure 4:
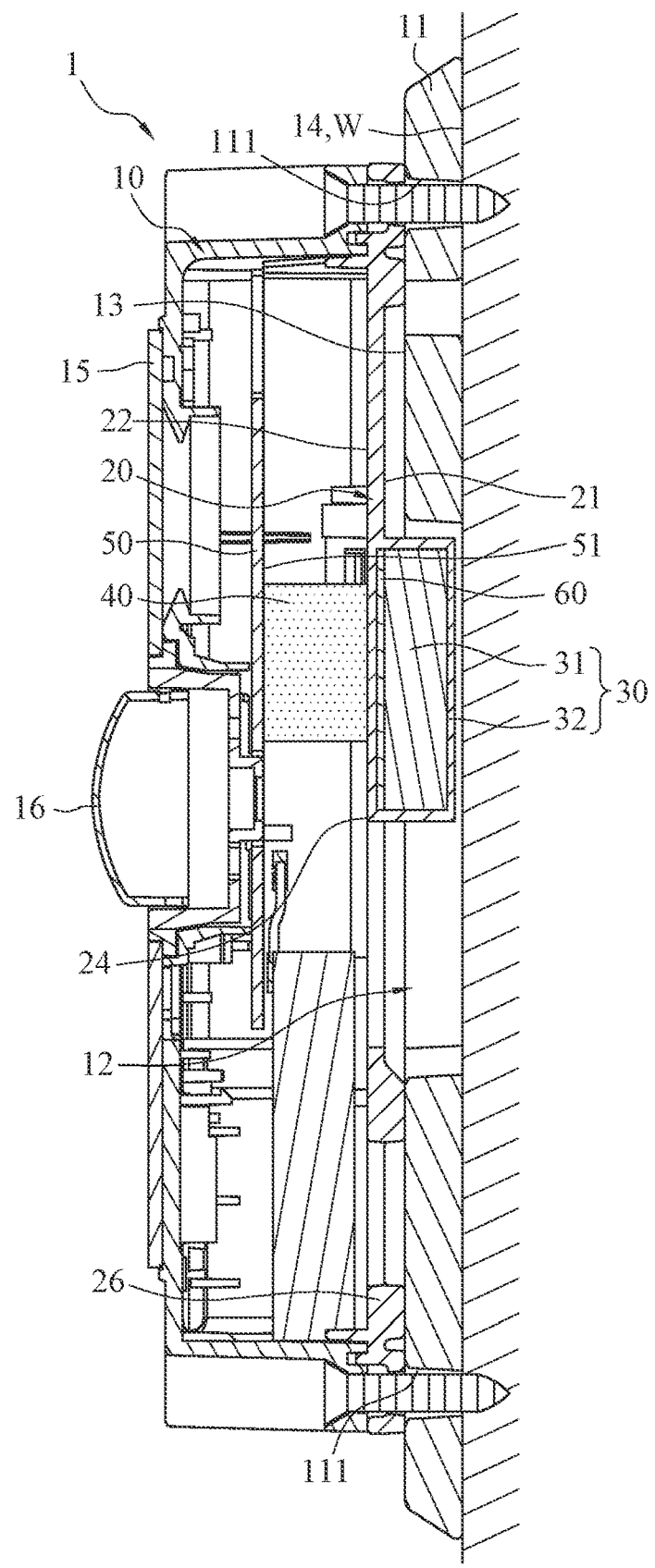
FIG. 4 illustrates a cross-sectional view along line 4-4 shown in FIG. 1.

FIG. 1 illustrates a perspective view of a doorbell device according to a first embodiment of the instant disclosure. FIG. 2 illustrates another perspective view of the doorbell device of the first embodiment. FIG. 3 illustrates an exploded view of the doorbell device of the first embodiment. FIG. 4 illustrates a cross-sectional view along line 4-4 shown in FIG. 1. As shown in FIGS. 1 to 4, the doorbell device 1 comprises a housing 10, a passive element 20, a battery module 30, and a thermal expansion element 40. The passive element 20, the battery module 30, and the thermal expansion element 40 are assembled in the housing 10. In some embodiments, the doorbell device 1 may be a wireless doorbell or a smart doorbell, and the doorbell device 1 is supplied with electricity through the battery module 30. The doorbell device 1 may be installed at the entrance or the exit of a house, an office, or a building so as to be served as a communication media for people indoor and people outdoor.

As shown in FIGS. 1 to 4, the housing 10 is a hollowed shell and comprises a mounting plate 11. The housing 10 is assembled to and fixed to an object at the entrance or the exit through the mounting plate 11. In this embodiment, the object is the wall surface W as an example, but embodiments are not limited thereto. The mounting plate 11 comprises a through hole 12, an inner surface 13, and an outer surface 14. The inner surface 13 and the outer surface 14 are two surfaces at opposite sides of the mounting plate 11. The inner surface 13 faces the interior of the housing 10, and the outer surface 14 faces the outside of the housing 10. When the housing 10 is assembled to and fixed to the wall surface W through the mounting plate 11, the outer surface 14 faces the wall surface W, and the outer surface 14 contacts the wall surface W, so that the outer surface 14 and the wall surface W are at the same plane. The through hole 12 is defined through the inner surface 13 and the outer surface 14 of the mounting plate 11 to communicate with the internal space of the housing 10.

In some embodiments, the mounting plate 11 may have at least one mounting portion 111. The mounting plate 11 may be assembled to and fixed to the wall surface W through the mounting portion 111. For example, the mounting portion 111 may be a lock hole, a hanging hook, a positioning support, or the like. As shown in FIGS. 1 to 4, in this embodiment, the mounting plate 11 has several mounting portions 111, and the mounting portions 111 are lock holes and adjacent to the corners of the mounting plate 11. Accordingly, screws can be applied to pass through the mounting portions 111 and the wall surface W, so that the mounting plate 11 and the wall surface W can be fixed with each other to allow the outer surface 14 to contact the wall surface W.

As shown in FIGS. 1 to 4, in this embodiment, the housing 10 comprises a front plate 15. The mounting plate 11 and the front plate 15 are two plates at opposite sides of the housing 10. The front plate 15 may have a functional component for the operation of a user. For example, the functional component may comprise a press switch 16 (as shown in FIG. 1), a microphone, a display, a camera, a fill light, or the like.

As shown in FIGS. 1 to 4, the passive element 20 is movably disposed in the housing 10. The passive element 20 comprises a first side surface 21 and a second side surface 22 opposite to the first side surface 21. The first side surface 21 faces the mounting plate 11, and the second side surface 22 faces the front plate 15. In this embodiment, the passive element 20 is a suspension arm and comprises a fixed end 23 and a free end 24. The fixed end 23 is fixed on the housing 10. For example, the fixed end 23 may be fixed on the housing 10 by adhering, riveting, locking, soldering, or the like. The free end 24 is unfixed and is adjacent to the through hole 12. Accordingly, when a force is applied to a portion of the passive element 20 adjacent to the free end 24, the passive element 20 can swing by taking the fixed end 23 as the swing center, so that the free end 24 moves close to or away from the mounting plate 11.

Further, as shown in FIGS. 3 and 4, in this embodiment, the passive element 20 is manufactured by processing a substrate 26. For example, the substrate 26 is partially cut to form the passive element 20 in the suspension arm configuration. After the processing procedure, the substrate 26 is then assembled and fixed in the housing 10, so that the fixed end 23 of the passive element 20 is indirectly fixed to the housing 10. In other embodiments, the passive element 20 may be an individual element, and the fixed end 23 of the passive element 20 is directly fixed to the housing 10.

In some embodiments, the passive element 20 may be movably disposed in the housing 10 by other ways. For example, the passive element 20 may be slidably disposed in the housing 10 by a rail, so that the passive element 20 can slide to move close to or away from the mounting plate 11 with respect to the housing 10 when the passive element 20 is applied with a force.

As shown in FIGS. 1 to 4, the battery module 30 is disposed on the first side surface 21 of the passive element 20 and corresponds to the through hole 12. In this embodiment, the battery module 30 is adjacent to the free end 24 of the passive element 20, and the size of the through hole 12 is greater than the size of the battery module 30. For example, the length and the width of the through hole 12 are respectively greater than the length and the width of the battery module 30. Accordingly, when the passive element 20 swings by taking the fixed end 23 as the swing center, the passive element 20 drives the battery module 30 to move within the through hole 12 to come close to or go away from the outer surface 14 of the mounting plate 11. However, it is understood that, embodiments are not limited thereto. The size of the through hole 12 may be less than or equal to the size of the battery module 30. Accordingly, when the passive element 20 swings by taking the fixed end 23 as the swing center, only a portion of the battery module 30 moves within the through hole 12 to come close to or go away from the outer surface 14 of the mounting plate 11. In some embodiments, the battery module 30 comprises a battery 31. The battery 31 may be a nickel-cadmium battery, a nickel-hydrogen battery, a lithium ion battery, a lithium polymer battery, or other rechargeable batteries so as to have a charging and discharging feature.

As shown in FIGS. 1 to 4, the thermal expansion element 40 is disposed between the second side surface 22 of the passive element 20 and the housing 10. Specifically, in some embodiments, the thermal expansion element 40 may be disposed between the second side surface 22 of the passive element 20 and the front plate 15 of the housing 10. In this embodiment, the thermal expansion element 40 is fixed on the second side surface 22 and adjacent to the free end 24, but embodiments are not limited thereto. The thermal expansion element 40 may be fixed on other components in the housing 10 and adjacent to or contact the second side surface 22, so that the position of the passive element 20 can be changed due to the thermal expansion and contraction feature of the thermal expansion element 40. In some embodiment, the coefficient of thermal expansion (CTE) of the terminal expansion element 40 may be greater than the coefficient of thermal expansion of the passive element 20. For example, the thermal expansion element 40 may be made of material(s) with high CTE, such as polyvinyl chloride (PVC, CTE is $80 \times 10^{-6}$/K), poly(methyl methacrylate) (PMMA, CTE is $85 \times 10^{-6}$/K), or Nylon (CTE is $120 \times 10^{-6}$/K). Conversely, the passive element 20 may be a swing arm made of material(s) with low CTE, such as aluminum alloy (CTE is $23.2 \times 10^{-6}$/K), iron (CTE is $12.2 \times 10^{-6}$/K), or stainless steel (CTE is $14.4 \times 10^{-6}$/K). However, it is understood, the foregoing materials are provided for illustrative purposes, but not limitations to embodiments of the instant disclosure.

As shown in FIGS. 1 to 4, in this embodiment, the thermal expansion element 40 is a block, and a fixing plate 50 is fixed in the housing 10. For example, the fixing plate 50 may be fixed in the housing 10 by adhering, riveting, locking, soldering, or the like. In this embodiment, the fixing plate 50 is a circuit board, but embodiments are not limited thereto. The fixing plate 50 is between the passive element 20 and the front plate 15. The thermal expansion element 40 is fixed between the second side surface 22 of the passive element 20 and the surface 51 of the fixing plate 50 facing the thermal expansion element 40. For example, the thermal expansion element 40 may be adhered to the second side surface 22 and the surface 51 of the fixing plate 50 by adhesives. In some embodiment, the thermal expansion element 40 may be only fixed on the surface 51 of the fixing plate 50 and not fixed on the second side surface 22 of the passive element 20, but embodiments are not limited thereto. Accordingly, when the volume of the thermal expansion element 40 gradually increases along with the increase of the temperature of the thermal expansion element 40, since the fixing plate 50 is fixed and the free end 24 of the passive element 20 is unfixed, the thermal expansion element 40 pushes the free rend 24 of the passive element 20 to drive the battery module 30 to move close to the outer surface 14 of the mounting plate 11.

In general, different kinds of battery module 30 have respective predetermined chargeable/dischargeable temperature intervals (e.g., between 0° C. and 60° C., between −20° C. and 50° C., between −10° C. and 45° C., or the like). In the doorbell device 1 according to one or some embodiments of the instant disclosure, with the thermal expansion and contraction feature of the thermal expansion element 40, the positions of the passive element 20 and the battery module 30 can be changed, such that the temperature of the battery module 30 can be maintained within the chargeable/dischargeable temperature interval. Specifically, in this embodiment, when the temperature of the thermal expansion element 40 is at a first temperature, the passive element 20 allows a gap to be maintained between the battery module 30 and the outer surface 14 of the housing 10. As shown in FIG. 4, in this embodiment, when the weather is cold (e.g., the ambient temperature is less than 0° C.) such that the temperature of the thermal expansion element 40 (namely, the first temperature) is less than or equal to a first condition temperature (the first condition temperature may be a temperature close to the ambient temperature when the weather is cold, such as 5° C., 10° C., 15° C., 20° C., or the like), the volume of the thermal expansion element 40 may be contracted due to the thermal expansion element 40 is cooled so as to drive the passive element 20 to be at a first position. The first positon is the positon of the passive element 20 in which a gap is between the battery module 30 and the outer surface 14 of the housing 10. Accordingly, since the gap is maintained between the battery module 30 and the outer surface 14, the battery module 30 at the low temperatures does not contact the wall surface W where the mounting plate 11 is assembled to achieve the effect of blocking heat conduction, such that the heat energy of the battery module 30 can be prevented from being transmitted to the wall surface W to have heat loss, thereby maintaining the temperature of the battery module 30 to be within the chargeable/dischargeable temperature interval. In this embodiment, the first temperature is less than or equal to the first condition temperature.

In some embodiments, as shown in FIG. 4, the doorbell device 1 further comprises an electrothermic element 60 (e.g., a heating tube or a heating plate). The electrothermic element 60 is connected to the battery module 30. When the battery module 30 is at low temperatures, the electrothermic element 60 can heat the battery module 30 to ensure that the temperature of the battery module 30 to be within the chargeable/dischargeable temperature interval. Moreover, when the passive element 20 is at the first position, the battery module 30 does not contact the wall surface W where the mounting plate 11 is assembled to prevent heat energy of the battery module 30 from being transferred to the wall surface W. Hence, the electrothermic element 60 can heat the battery module 30 to a predetermined temperature or within the chargeable/dischargeable temperature interval rapidly, thereby effectively enhancing the heating efficiency of the electrothermic element 60.

Figure 5:
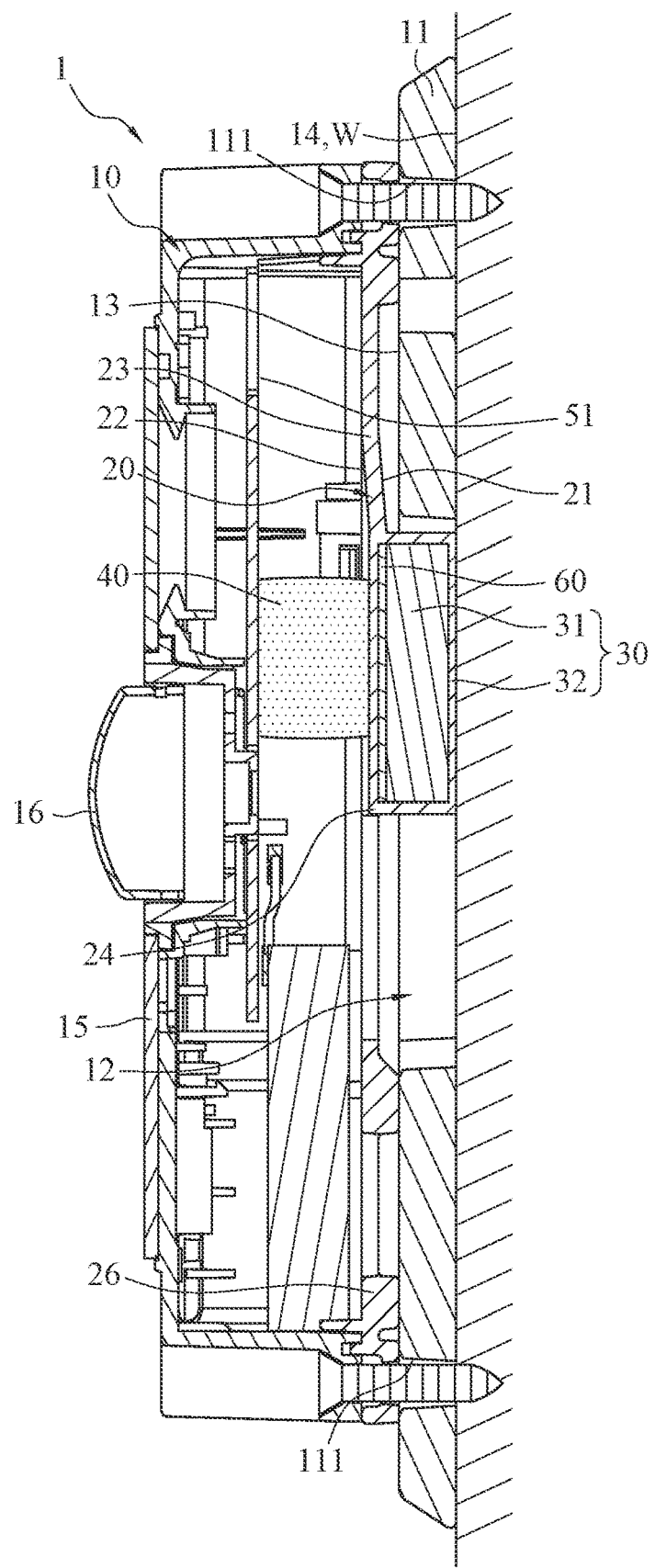
FIG. 5 illustrates a schematic operational view of the doorbell device of the first embodiment.

FIG. 5 illustrates a schematic operational view of the doorbell device 1 of the first embodiment. When the temperature of the thermal expansion element 40 is at a second temperature, the thermal expansion element 40 drives the passive element 20 to allow at least one portion of the battery module 30 to be located in the through hole 12 and to allow the at least one portion of the battery module 30 and the outer surface 14 to be at the same plane. As shown in FIG. 5, in this embodiment, when the weather is hot (e.g., the ambient temperature is higher than 35° C.) such that the temperature of the thermal expansion element 40 (namely, the second temperature) is greater than or equal to a second condition temperature (the second condition temperature may be a temperature close to the ambient temperature when the weather is hot, such as 25° C., 28° C., 30° C., 3° C., or the like), the volume of the thermal expansion element 40 may be expanded due to the thermal expansion element 40 is heated so as to push and to drive the free end 24 of the passive element 20 to be moved toward the mounting plate 11 and to be moved from the first position to a second positon. The second positon is the positon of the passive element 20 in which at least one portion of the battery module 30 is located in the through hole 12 and the at least one portion of the battery module 30 and the outer surface 14 are at the same plane. Namely, in some embodiments, at least one region of the battery module 30 and the outer surface 14 are at the same plane. For example, in this embodiment, the outer surface 14 and a portion of the surface of the battery module 30 adjacent to the outer surface 14 are at the same plane, so that the portion of the surface of the battery module 30 contacts the wall surface W. Accordingly, when the battery module 30 is at the high temperatures, the heat energy can be transferred to the wall surface W to achieve the effect of heat dissipation, thereby maintaining the temperature of the battery module 30 to be within the chargeable/dischargeable temperature interval. Moreover, as shown in FIGS. 4 and 5, the battery module 30 is fixed to the first side surface 21 of the passive element 20, such that the battery module 30 is moved together with the passive element 20 when the passive element 20 is moved. Hence, after the battery module 30 is heated or performs charging/discharging for several times so as to be expanded, through the movement of the passive element 20, the battery module 30 does not push other components (e.g., the housing 10) of the doorbell device 1 to cause damages of the doorbell device 1 and damages of components of the doorbell device 1. In this embodiment, the second temperature is greater than the second condition temperature.

In some embodiments, when the temperature of the thermal expansion element 40 is less than or equal to a condition temperature (the condition temperature may be, for example, 20° C., 25° C., 30° C., 35° C., or the like), the passive element 20 allows a gap to be maintained between the battery module 30 and the outer surface 14 of the housing 10. When the temperature of the thermal expansion element 40 is greater than the condition temperature, the thermal expansion element 40 drives the passive element 20 to move, so that at least one portion of the battery module 30 is located in the through hole 12 and the at least one portion of the battery module 30 and the outer surface 14 are at the same plane. Namely, the first temperature is less than or equal to the condition temperature, and the second temperature is greater than the condition temperature. For example, as shown in FIG. 4, the condition temperature may be 30° C.; when the temperature of the thermal expansion element 40 is less than or equal to 30° C., the passive element 20 allows a gap to be maintained between the battery module 30 and the outer surface 14 of the housing 10, so that the battery module 30 does not contact the wall surface W where the mounting plate 11 is assembled to achieve the effect of blocking heat conduction. As shown in FIG. 5, when the temperature of the thermal expansion element 40 is greater than 30° C., the thermal expansion element 40 is heated to be expanded so as to drive the passive element 20 to move, so that at least one portion of the battery module 30 is located in the through hole 12 and the at least one portion of the battery module 30 and the outer surface 14 are at the same plane. Hence, the at least one portion of the battery module 30 can contact the wall surface W and then the heat energy of the battery module 30 is transferred to the wall surface W.

In some embodiments, as shown in FIG. 4, since the change of volume of the thermal expansion element 40 caused by heating the thermal expansion element 40 is limited, when the passive element 20 is at the first position, at least one portion of the battery module 30 is also located in the through hole 12. Accordingly, the gap between the battery module 30 and the outer surface 14 of the housing 10 is not too big. Hence, when the passive element 20 is moved to the second position, at least one portion of the battery module 30 and the outer surface 14 can be at the same plane and the at least one portion of the battery module 30 contacts the wall surface W.

As shown in FIGS. 4 and 5, in this embodiment, the battery module 30 comprises a thermal conductive shield 32, and the thermal conductive shield 32 encloses the battery 31. The thermal conductive shield 32 may be made of materials with great thermal conductivity, for example, materials like metals or ceramics having high thermal conductivity coefficients. Therefore, when the battery module 30 contacts the wall surface W, the transfer of the heat energy of the battery 31 to the wall surface W can be accelerated through the thermal conductive shield 32, thereby further enhancing the heat dissipation. In some embodiments, the thermal conductive shield 32 of the battery module 30 and the passive element 20 may be integrally formed with each other as a one-piece structure (as shown in FIGS. 4 and 5). Alternatively, the thermal conductive shield 32 and the passive element 20 may be an assembled structure. For example, the thermal conductive shield 32 may be assembled on the first side surface 21 of the passive element 20 by adhering, riveting, locking, soldering, or the like. In some embodiments, the battery module 30 may only have the battery 31, and the battery 31 is directly fixed to the first side surface 21 of the passive element 20.

As shown in FIGS. 4 and 5, in this embodiment, the electrothermic element 60 is disposed in the thermal conductive shield 32, and the electrothermic element 60 contacts the battery 31 and the surface of the thermal conductive shield 32. Accordingly, when the electrothermic element 60 generates heat, the heat can be transferred to heat the battery 31 in a further smooth manner through the transfer of the thermal conductive shield 32, thereby increasing the heating efficiency.

Figure 6:
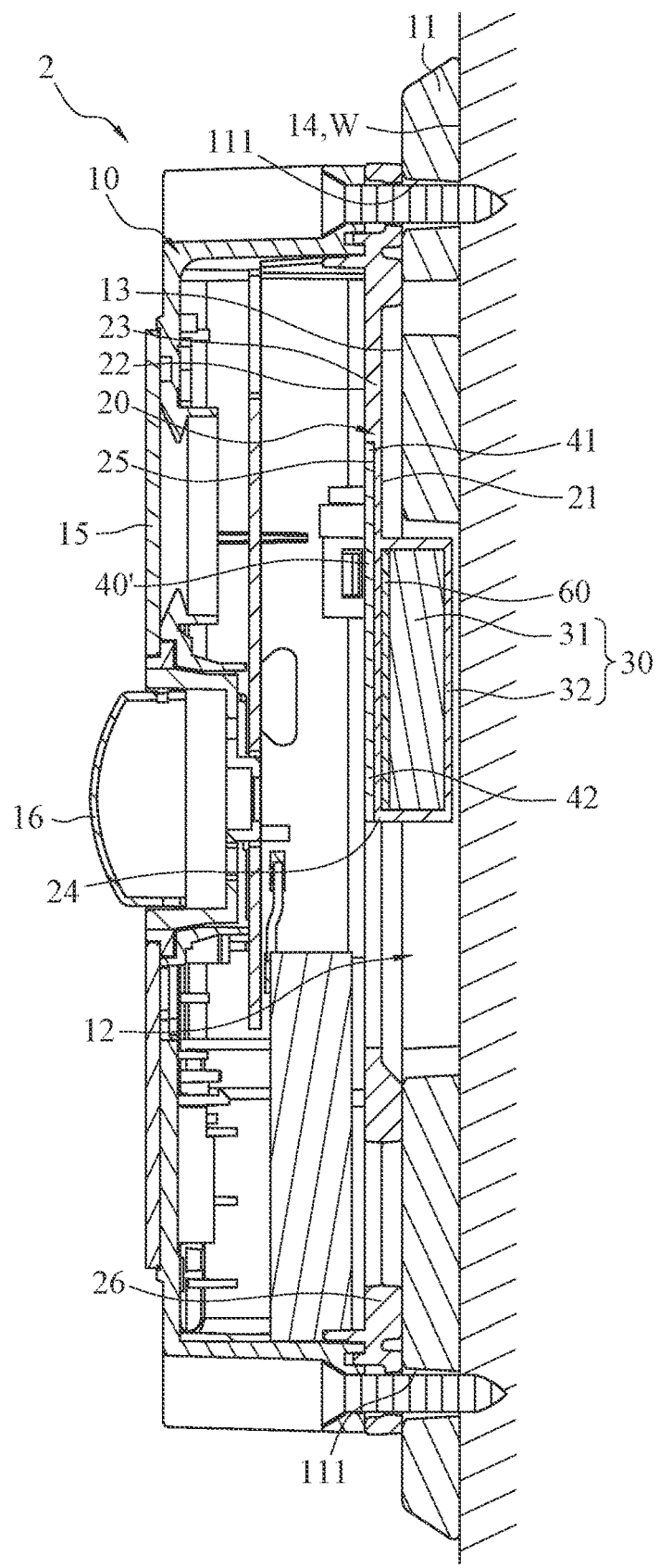
FIG. 6 illustrates a cross-sectional view of a doorbell device according to a second embodiment of the instant disclosure.
Figure 7:
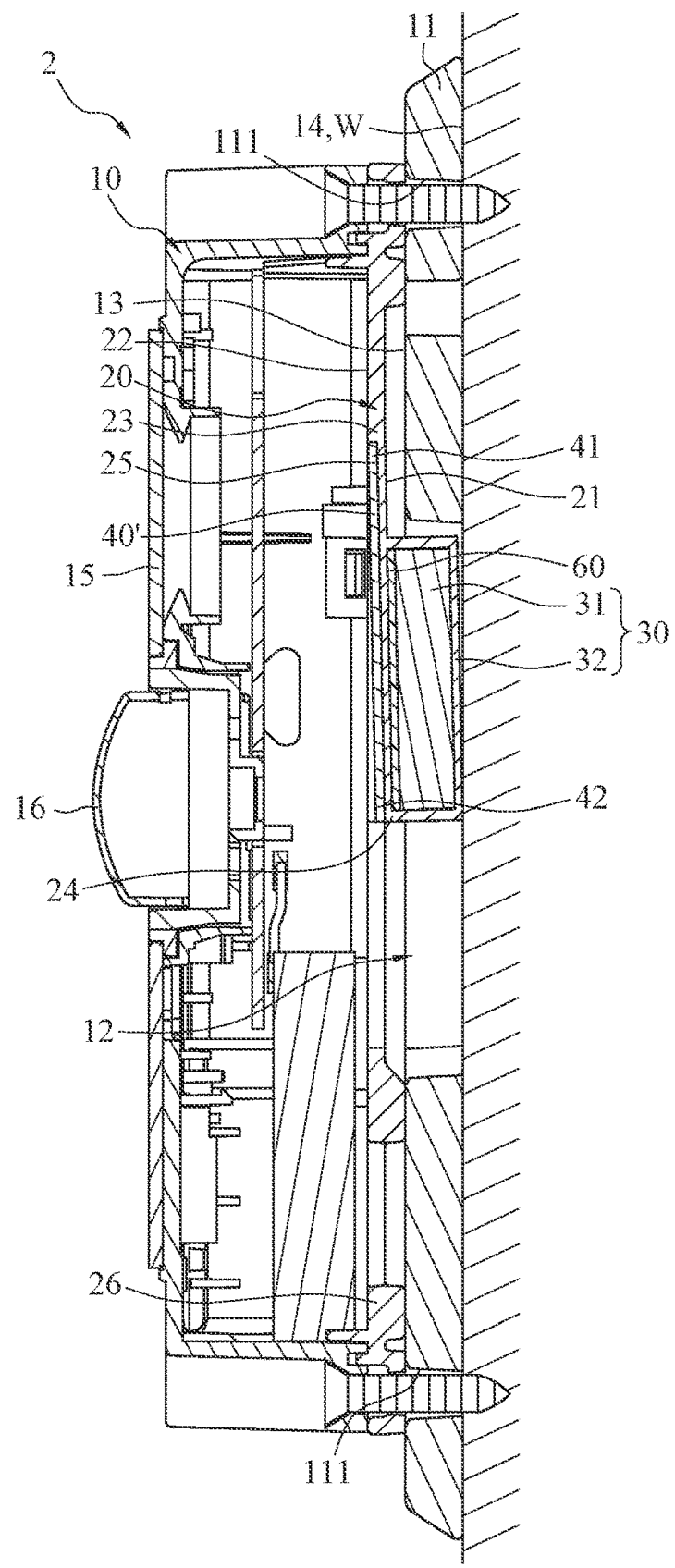
FIG. 7 illustrates a schematic operational view of the doorbell device of the second embodiment.

FIG. 6 illustrates a cross-sectional view of a doorbell device 2 according to a second embodiment of the instant disclosure. FIG. 7 illustrates a schematic operational view of the doorbell device 2 of the second embodiment. As shown in FIGS. 6 and 7, the difference between the second embodiment and the first embodiment is at least that, in this embodiment, the thermal expansion element 40' of the doorbell device 2 is elongate shaped. In this embodiment, the passive element 20 and the thermal expansion element 40' are both elongated plates and are stacked with each other. The first end 41 of the thermal expansion element 40' is adjacent to the fixed end 23 of the passive element 20, and the second end 42 of the thermal expansion element 40' is adjacent to the free end 24 of the passive element 20. Moreover, the CTE of the thermal expansion element 40' is greater than the CTE of the passive element 20.

Accordingly, as shown in FIG. 7, when the weather is hot such that the temperature of the thermal expansion element 40' is at the second temperature, the heated expansion amount of the thermal expansion element 40' is greater than the heated expansion amount of the passive element 20. Moreover, since the passive element 20 and the thermal expansion element 40' are stacked with each other and assembled with each other, the thermal expansion element 40' having a larger expansion amount bends toward the passive element 20 having a smaller expansion amount so as to drive the free end 24 of the passive element 20 to bend and move. Accordingly, at least one portion of the battery module 30 is located in the through hole 12 and the at least one portion of the battery module 30 and the outer surface 14 are at the same plane. Hence, when the battery module 30 is at high temperatures, the heat energy can be transferred to the wall surface W, thereby achieving the heat dissipation.

As shown in FIG. 6, when the weather is cold such that the temperature of the thermal expansion element 40' is at the first temperature, the passive element 20 having a smaller expansion amount bends toward the thermal expansion element 40' having a larger expansion element. Accordingly, a gap is maintained between the battery module 30 and the outer surface 14 of the housing 10. Hence, when the battery module 30 is at low temperatures, the battery module 30 does not contact the wall surface W where the mounting plate 11 is assembled to achieve the effect of blocking heat conduction, thereby preventing the heat energy of the battery module 30 from being transferred to the wall surface W to have heat loss.

As shown in FIGS. 6 and 7, in this embodiment, the second side surface 22 of the passive element 20 further comprises a receiving groove 25, and the thermal expansion element 40' is received in the receiving groove 25 to improve the assembling steadiness after the thermal expansion element 40' is assembled with the passive element 20.

Based on the above, in the doorbell device according to one or some embodiments of the instant disclosure, with the thermal expansion and contraction feature of the thermal expansion element, the position of the passive element can be changed and the battery module can be moved. Hence, when the battery module is at a low temperature, a gap is maintained between the battery module and the outer surface of the housing so as to prevent the heat loss of the battery module; when the battery is at a high temperature, the battery module can contact an object (e.g., the wall) where the outer surface of the housing is assembled so as to achieve heat dissipation, thereby allowing the battery module can be operated within the predetermined charging/discharging temperature interval. Moreover, according to one or some embodiments of the instant disclosure, after the battery module is heated or performs charging/discharging for several times so as to be expanded, the battery module does not push other components of the doorbell device to cause damages of the doorbell device or damages of other components of the doorbell device.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A doorbell device comprising:
   a housing comprising a mounting plate, wherein the mounting plate comprises a through hole, an inner surface, and an outer surface, and wherein the through hole is defined through the inner surface and the outer surface of the mounting plate;
   a passive element movably disposed in the housing, wherein the passive element comprises a first side surface and a second side surface opposite to the first side surface, and the first side surface faces the mounting plate;
   a battery module disposed on the first side surface and corresponds to the through hole; and
   a thermal expansion element disposed between the second side surface of the passive element and the housing;
   wherein when a temperature of the thermal expansion element is at a first temperature, the passive element allows a gap to be maintained between the battery module and the outer surface of the housing;
   wherein when the temperature of the thermal expansion element is at a second temperature, the thermal expansion element drives the passive element to allow at least one portion of the battery module to be located in the through hole and to allow the at least one portion of the battery module and the outer surface to be at a same plane;
   wherein the first temperature is different from the second temperature.

2. The doorbell device according to claim 1, wherein when the temperature of the thermal expansion element is at the second temperature, the thermal expansion element is heated to expand to allow the passive element to move toward the mounting plate, so that the at least one portion of the battery module is located in the through hole and the at least one portion of the battery module and the outer surface are at the same plane.

3. The doorbell device according to claim 1, wherein a coefficient of thermal expansion of the thermal expansion element is greater than a coefficient of thermal expansion of the passive element.

4. The doorbell device according to claim 1, wherein the second temperature is greater than the first temperature.

5. The doorbell device according to claim 1, wherein when the temperature of the thermal expansion element is at the first temperature, the passive element allows the at least one portion of the battery module to be located in the through hole.

6. The doorbell device according to claim 1, wherein the first temperature is less than or equal to a first condition temperature, the second temperature is greater than a second condition temperature, and the first condition temperature is different from the second condition temperature.

7. The doorbell device according to claim 1, wherein the first temperature is less than or equal to a condition temperature, and the second temperature is greater than the condition temperature.

8. The doorbell device according to claim 1, wherein the passive element is a suspension arm and comprises a fixed end and a free end, the fixed end is fixed on the housing, the free end is adjacent to the through hole, and the battery module and the thermal expansion element are adjacent to the free end.

9. The doorbell device according to claim 8, wherein the battery module comprises a battery and a thermal conductive shield, and the thermal conductive shield encloses the battery.

10. The doorbell device according to claim 8, further comprising a fixing plate, wherein the fixing plate is fixed in the housing, and the thermal expansion element is fixed between the second side surface of the passive element and the fixing plate.

11. The doorbell device according to claim 8, wherein the thermal expansion element is elongated shaped and comprises a first end and a second end, the first end is adjacent to the fixed end, and the second end is adjacent to the free end.

12. The doorbell device according to claim 8, wherein the second side surface of the passive element comprises a receiving groove, and the thermal expansion element is fixed in the receiving groove.

13. The doorbell device according to claim 1, further comprising an electrothermic element, wherein the electrothermic element is connected to the battery module.

* * * * *